United States Patent [19]
Zhou

[11] Patent Number: 5,970,099
[45] Date of Patent: Oct. 19, 1999

[54] SILENT POLARITY REVERSAL IN A COMMUNICATION SYSTEM

[75] Inventor: Yan Zhou, Austin, Tex.

[73] Assignee: Advanced Micro Devices, Inc., Sunnyvale, Calif.

[21] Appl. No.: 08/870,894

[22] Filed: Jun. 6, 1997

[51] Int. Cl.[6] .......................... H04B 15/00; H04L 25/34; H03B 21/00; H03K 3/017
[52] U.S. Cl. .......................... 375/285; 375/288; 327/106; 327/171; 702/124
[58] Field of Search ...................................... 379/377, 382, 379/399, 180; 375/346, 285, 288; 327/28, 30, 291, 100, 105, 106, 107, 126, 129, 164, 165, 171; 332/107, 112; 702/124, 125, 126

[56] References Cited

U.S. PATENT DOCUMENTS

| | | | |
|---|---|---|---|
| 3,614,622 | 10/1971 | Holsinger | 333/18 |
| 4,056,694 | 11/1977 | Brolin | 379/180 |
| 4,996,697 | 2/1991 | Critchow et al. | 375/351 |
| 5,008,900 | 4/1991 | Critchow et al. | 375/229 |
| 5,058,111 | 10/1991 | Kihara et al. | 370/420 |
| 5,519,692 | 5/1996 | Hershey et al. | 375/205 |

*Primary Examiner*—Stephen Chin
*Assistant Examiner*—Albert Park
*Attorney, Agent, or Firm*—Skjerven, Morrill, MacPherson, Franklin & Friel, LLP

[57] ABSTRACT

A line card integrates subscriber line interface circuitry, A/D and D/A converters, and digital signal processing technology. The digital signal processing technology performs many line card tasks such as switch hook detection, ground key detection, DC feed control, polarity reversal, ringing tests, fault detection, power cross detection, and ring trip detection. Silent polarity reversal is achieved by modulating a digital DC feed current waveform in accordance with a programmable predetermined waveform to smoothly transition the DC voltage of subscriber loop conductors A and B between approximately ground and central office battery voltage. The modulated waveform includes little if any energy in audio frequencies. Additionally, the functionality of the line cards 308[m:1] may be implemented partially or completely in hardware of software.

33 Claims, 12 Drawing Sheets

| 12 | WAVE FORM MODULATION LUT |
|---|---|
| 1) | 32138 |
| 2) | 30274 |
| 3) | 27245 |
| 4) | 23170 |
| 5) | 18205 |
| 6) | 12539 |
| 7) | 6393 |
| 8) | 0 |
| 9) | -6393 |
| 10) | -12539 |
| 11) | -18205 |
| 12) | -23170 |
| 13) | -27245 |
| 14) | -30274 |
| 15) | -32138 |
| 16) | -32768 |

*FIG. 10*

SILENT POLARITY REVERSAL IN A COMMUNICATION SYSTEM

BACKGROUND OF THE INVENTION

1. Field of the Invention

This invention relates to communication systems and particularly to communication systems providing polarity reversal to a transmission line.

2. Description of the Related Art

Communication systems utilizing transmission lines such as subscriber loops are commonplace throughout much of the world. Subscriber loops are terminated on one end by terminal equipment and provide a path for the terminal equipment to communicate with other terminal equipment via, for example, a vast network of central offices, private branch exchanges, satellite relay systems, transmission lines, repeaters, and wireless systems. FIG. 1 illustrates a portion of a conventional subscriber loop communication system 100. The subscriber loop 102 is modeled as a balanced two-wire transmission line 103, with loop resistances R and inductances L and leakage impedance modeled by capacitor 104 and resistor 106. The subscriber loop 102 is terminated on respective ends by terminal equipment 110 and a central office 122 line card 120. The subscriber loop 102 provides a communication path for information transmission such as voice signals and signaling information between a subscriber's terminal equipment and the central office 108.

Terminal equipment 110 is illustratively modeled as a telephone with off-hook resistance 112, nominally 200 ohms, and ringer impedance Z, which may be modeled, for example, as a series RC or series RLC circuit. Terminal equipment 110 includes a switch hook 118 which loads the subscriber loop 102 on the subscriber end with resistance 112 when the terminal equipment 110 is off-hook (as shown) and loads subscriber loop 102 with ringer impedance Z when the terminal equipment 110 is on-hook. Terminal equipment 110 may be any of a variety of devices besides the familiar, ubiquitous telephone such as facsimile machines, private branch exchanges, voice mail systems key telephone systems, computers, modems, telephone answering machines, alarm systems, and radio control systems, as well as many other devices.

The other end of the subscriber loop 102, opposite terminal equipment 110, converges on line card 120 of central office 122. The line card 120 terminates subscriber loop 102 at conductors A (Tip) and B (Ring) with a feed impedance of 900 ohm or other standard feed impedance. The line card 120 provides a gateway to the public switched telephone network (PSTN) through switching network 124.

Referring to FIG. 2, the subscriber line interface circuit (SLIC) 202 of line card 120 provides a two-wire interface 204 to the generally analog signal carrying subscriber loop 102. The SLIC 202 performs a variety of interface functions that allow terminal equipment 110 to communicate with other terminal equipment (not shown). The SLIC 202 and the subscriber loop audio-processing circuit (SLAC) 206 carry out the well-known BORSCHT (Battery feed, Overvoltage protection, Ringing, Supervision, Coding, Hybrid, and Test) functions. The SLIC 202 monitors direct current (DC) levels on the subscriber loop 102 with ground key detector circuitry 208 and off-hook detector circuitry 210. Input decoder and control circuitry 214 provides a mechanism for other circuitry (not shown) in the central office 122 and for SLAC 206 to control such SLIC 202 functions as subscriber loop 102 activation, ringing, and polarity reversal. Analog two-wire interface 204 and signal transmission circuitry 212 cooperate in sensing subscriber loop 102 metallic voltage (voltage at conductor A minus voltage at conductor B or Vab) while generally having a high rejection of longitudinal voltages (Vab_long). Alternating current (AC) signals, such as voice signals, are transmitted over subscriber loop 102 to terminal equipment 110 by two-wire interface 204 and signal transmission circuitry 212 in response to voice information input signals received from central office 122 through SLAC 206. The ring relay driver 216 activates a relay(s) which connects a ringing signal from a central office 122 ringing AC voltage generator (not shown) and DC voltage bias source, to terminal equipment 110 when a third party is calling. While terminal equipment 110 is on-hook, switch hook 118 connects subscriber loop 102 across the ringer impedance Z (FIG. 1). The ring trip detector circuitry 218 detects an off-hook condition of terminal equipment 110 and initiates cessation of the ringing voltage signal application to subscriber loop 102.

The SLAC 206 generally filters and converts analog output signals received from SLIC 202 into digital signals (A/D), processes the signals in accordance with control and timing information, and compresses the digital signals. The pulse code modulation (PCM) interface 220 provides PCM signals to the central office 122. SLAC 206 also generally receives digital audio input signals from the central office 122 via PCM interface 220, expands the digital input signals, processes the signal in accordance with control and timing information, and converts the digital signals into analog signals (D/A) for input to SLIC 202. Additional information on SLICs and SLACs is found in the 1995 Advanced Micro Devices of California data book entitled "Linecard Products for the Public Infrastructure Market."

The power feed controller 222 includes a battery feed circuit and a polarity reversal circuit. The battery feed functions supply direct current from a central office battery (not shown) to the subscriber loop 102 through balanced feed resistances at conductors A and B. Loop current is generally limited to no more than 45 to 75 milliamperes (mA) in a low-resistance subscriber loop. Higher subscriber loop resistances generally result in lower subscriber loop current. The on-hook subscriber loop powering voltage is typically the battery voltages minus 48 Volts DC (Vdc) less any overhead voltage, typically about 4 Vdc, necessary to prevent SLIC 202 saturation. Battery feed specifications are regionally provided and conform with specifications provided by, for example, BELLCORE, the Electronic Industries Association (EIA), British Telecom, and the International Telegraph and Telephone Consultative Committee (CCITT).

Public terminal equipment, such as public pay phones and hotel/motel phones, are commonly provided on a fee for use basis. Polarity reversal of subscriber A and B conductors is commonly used to initiate charges. Periodic polarity reversals during an on-going communication may be used to provide an indication to the user of elapsed connection time and indicate incurred charges. Polarity reversals may also provide a control signal to the terminal equipment for performing any of a number of well-known tasks.

For example, assuming that terminal equipment 110 is a public pay phone, when a user lifts the handset from the cradle, the phone goes off-hook, and a low resistance 112 is connected across the subscriber 102 loop A and B conductors by switch hook 118. Line card 120 responds to the current change by providing a dial tone. Normal subscriber loop polarity is conductor A grounded and conductor B at a nominal −48 V. The user dials an identification number of another terminal equipment, and a connection is established. When the called party answers and answer supervision is passed through the switching network 124, line circuit 120 immediately reverses battery polarity, thus, switching conductor A to −48 V and conductor B to ground. Regional specifications generally dictate the polarity reversal transition time to be no more than 64 milliseconds (ms).

During polarity reversal, audible frequency bias current changes are undesirable as they may cause noise to be transmitted through the phone transmitter to the ear of the user. The problem is especially acute when the impedance of subscriber loop 102 is large because small voltage changes cause large magnitude current changes. Thus, loud audible noises may be generated.

FIG. 2b illustrates a conventional approach to achieving polarity reversal. An increasing stair step voltage waveform 224 is generated by power feed controller 222 to change the voltage of conductor B from −48 V to +48 V. The waveform 224 is applied to the input terminals of a low pass filter 226 to polish the high frequency components of waveform 224. However, the low pass filter 226 output waveform 228 may still generate audible frequency current changes due to imperfect filtering and variable subscriber loop 102 impedance conditions. Likewise, the low pass filter 226 also produces a decreasing output waveform 232 from the decreasing stair step voltage input waveform 230 that may likewise generate audible frequency current changes in subscriber loop 102.

Thus, obtaining silent polarity reversal, especially in a dynamic environment, with conventional analog circuitry is a non-trivial problem. Furthermore, even if analog circuitry functions adequately for a given subscriber loop impedance, it may not function for the entire range of static and dynamic subscriber loop impedances for a given communication system. Moreover, the analog circuitry may not function reliably over time as analog circuitry often suffers from well-known aging side effects such as instability and circuit parameter drifting which may affect long-term reliability. Moreover, analog circuit features in an integrated circuit are large, presently in general on the order of about 7 μm, which increases costs of analog integrated circuitry. Furthermore, providing a cost efficient common hardware platform which lends itself to cost effective modifications to conform with various regional standards and operating environments is at least a difficult problem.

SUMMARY OF THE INVENTION

It is desirable to provide silent polarity subscriber loop reversal with a platform having the flexibility to adapt to changing subscriber loop status. In one embodiment, a communication system line card employs the precision and stability of digital signal processing technology with the flexibility of software to provide reliable and adaptable silent polarity reversal. A central office generally communicates and processes digital signals. Digitally processed signals are made directly available to the central office and the line card which in at least one embodiment enhances the overall capabilities and efficiencies of the communication system by, for example, efficiently allocating processing resources and control functions. The line card modulates a DC waveform in accordance with a predetermined waveform that is designed to achieve a transient waveform with frequency components generally below the human audio frequency range.

In one embodiment of the present invention, a method for modulating a waveform of a transmission line in a communication system includes the steps of modulating a first discrete time waveform sampled from the transmission line with a predetermined waveform to generate a second discrete time waveform, converting the second discrete time waveform into a continuous time waveform having substantially the same frequency components as the predetermined waveform, and providing the continuous time waveform to the transmission line.

In another embodiment of the present invention, a method of reversing polarity of A and B conductors of a plurality of subscriber loops includes the steps of providing a respective direct current, Idc(N), to each of N subscriber loops, where N is an integer, detecting each Idc(N), sampling each Idc(N), and storing each Idc(N) in a memory coupled to a processor. The method further includes the step of executing a computer program, for each of the of the N subscriber loops, with the processor. The computer program is stored in a memory coupled to the processor and includes processor executable instructions for:

monitoring for polarity reversal requests for respective subscriber loops from a central office;

if a polarity request is monitored which requests positive polarity with respect to conductor B, the method comprises the steps of:

a) multiplying the stored Idc(N) by a value derived from a first look up table entry of M look up table entries stored in a memory coupled to the processor to generate a discrete time control signal;

b) multiplying the stored Idc(N) by a value derived from a subsequent look up table entry to generate a following discrete time control signal;

c) converting the successive discrete time control signals into a continuous time waveform control signal;

d) generating a current waveform on the respective subscriber loop with approximately the same frequency components as the discrete time waveform control signal; and e) repeating the steps of b), c), and d) for each of the M look up table entries;

if a polarity request is monitored which requests positive polarity with respect to conductor A, the method comprises the steps of:

f) multiplying the stored Idc(N) by a value derived from a last look up table entry of the M look up table entries to generate a discrete time control signal;

g) multiplying the stored Idc(N) by a value derived from a preceding look up table entry to generate a following discrete time control signal;

h) converting the successive discrete time control signals into a continuous time waveform control signal;

i) generating a current waveform on the respective subscriber loop with approximately the same frequency components as the discrete time waveform control signal; and j) repeating the steps of g), h), and i) for each of the M look up table entries.

In another embodiment of the present invention, a communication system includes circuitry for sampling a first continuous time signal on a subscriber loop and a line card having a processor and a memory and coupled to the sampling circuitry, the memory storing code for execution by the processor, the code including instructions for modulating the sampled first continuous time signal with predetermined discrete time waveform components stored in the memory to generate a discrete time control signal. The communication system further includes circuitry coupled to the processor responsive to the discrete time control signal to drive a second continuous time signal on the subscriber loop, wherein the second continuous time signal has at least approximately the same frequency component(s) as the predetermined discrete waveform.

BRIEF DESCRIPTION OF THE DRAWINGS

Features appearing in multiple figures with the same reference numeral are the same unless otherwise indicated.

FIG. 10 illustrates a programmable look up table of exemplary waveform modulation factors.

DETAILED DESCRIPTION

The following description of the invention is intended to be illustrative only and not limiting.

Figure 3:
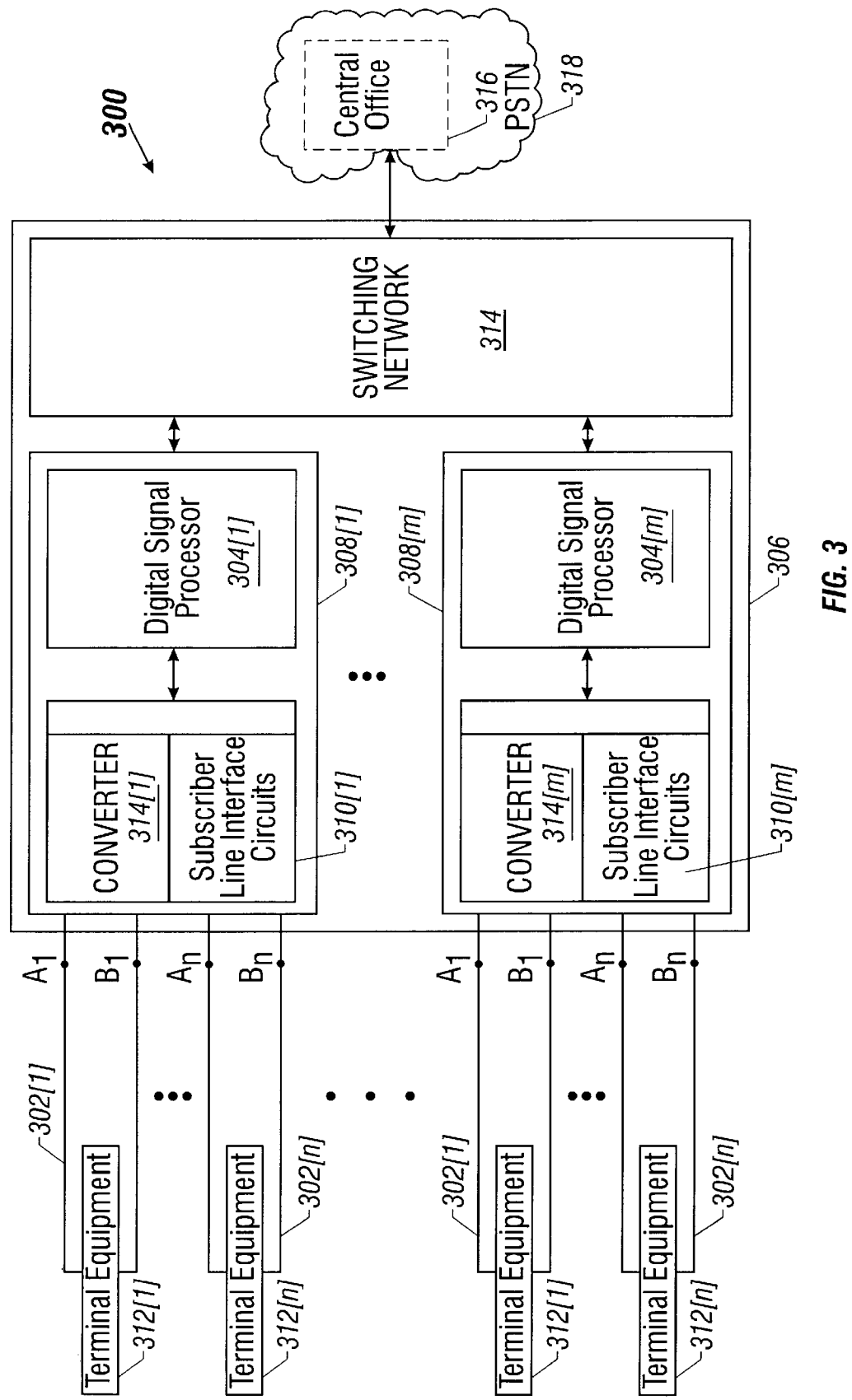
FIG. 3 illustrates a communication system having a line card employing a digital signal processor.

Referring to FIG. 3, in the communication system 300, each of the line cards 308[m] through 308[1] (308[m:1]) integrates analog data sensing and driving circuitry of SLICs 310[m:1], respectively, with programmable digital signal processors 304[m:1], respectively. Thus, the line cards 308[m:1] deliver adaptability through programmability and long-term precision with digital signal processing circuitry stability in digital signal processors 304[m:1]. Thus, line cards 308[m:1] are well suited to assume functionality conventionally tasked to analog SLIC circuitry. Furthermore, the digital signal processing circuitry integrated circuit features are generally much smaller than analog circuit features and may be on the order of, for example, 0.25 $\mu$m which decreases the cost of line cards 308[m:1] relative to any analog signal processing features.

Figure 1:
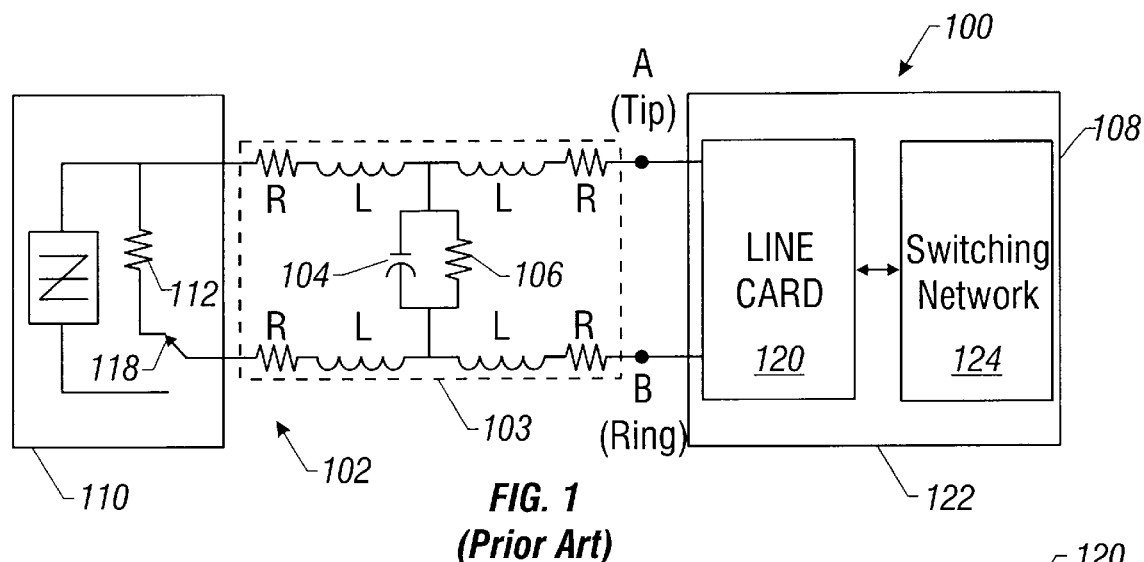
FIG. 1, labeled prior art, illustrates a subscriber loop terminated by subscriber terminal equipment and central office equipment.
Figure 2A:
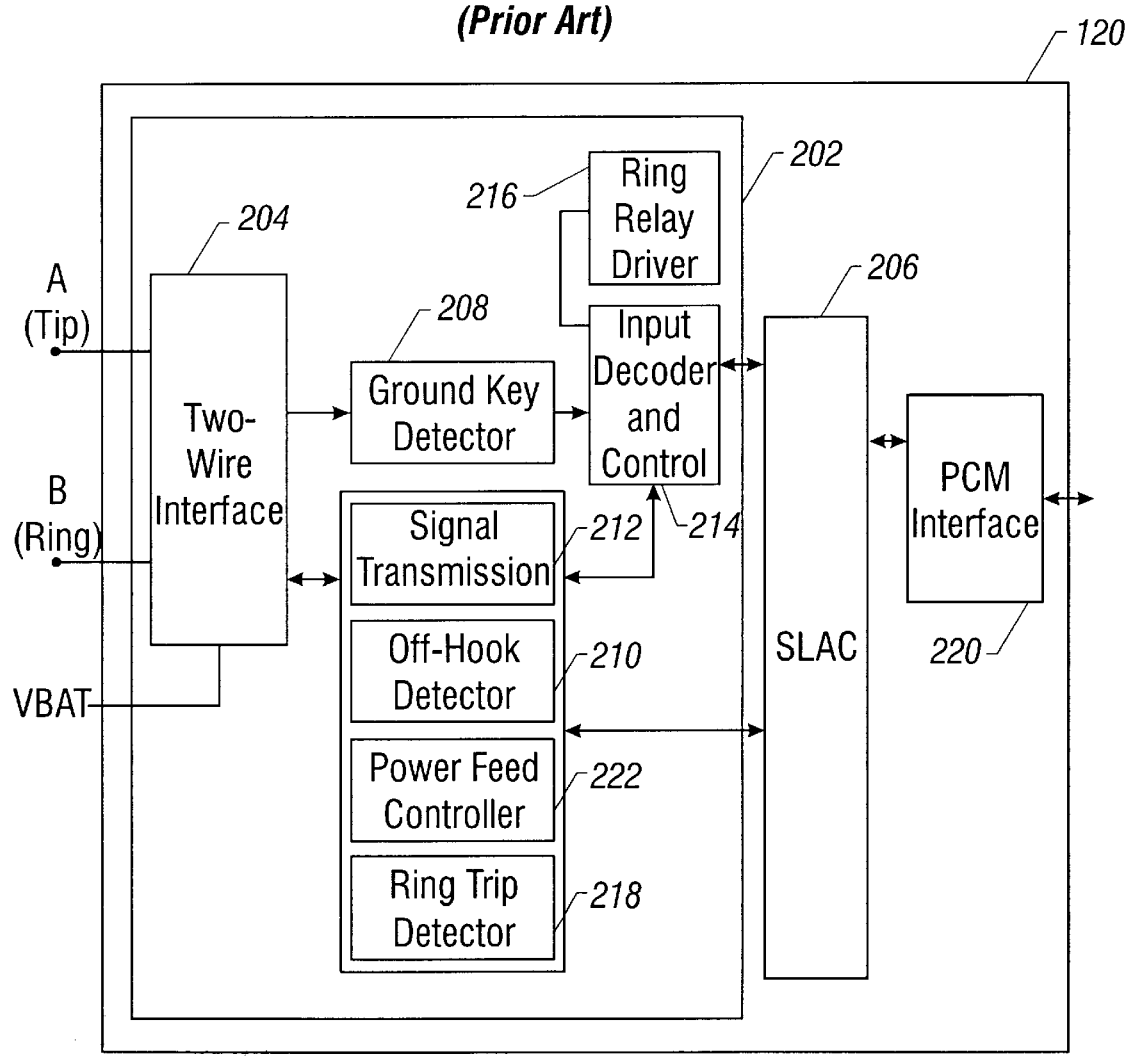
FIG. 2a, labeled prior art, illustrates a line card.
Figure 2B:
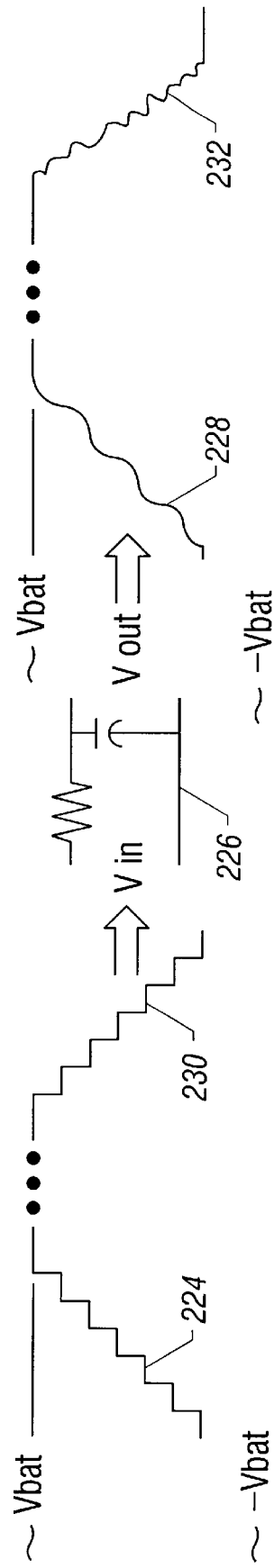
FIG. 2b, labeled prior art, illustrates a polarity reversal polishing filter with input and output waveforms.

One such function is the polarity reversal function. Direct current is applied through a subscriber loop, such as subscriber loop 102 (FIG. 1) and subscriber loops 302[1] through 302[n] (302[n:1]), during off-hook conditions. When a polarity reversal request is received from central office 306, a digital signal processor 304[x] modulates the DC current in accordance with a programmable, predetermined waveform to reverse the polarity of the voltage (Vab) across the subscriber loop 302[x] A and B conductors.

Figure 4:
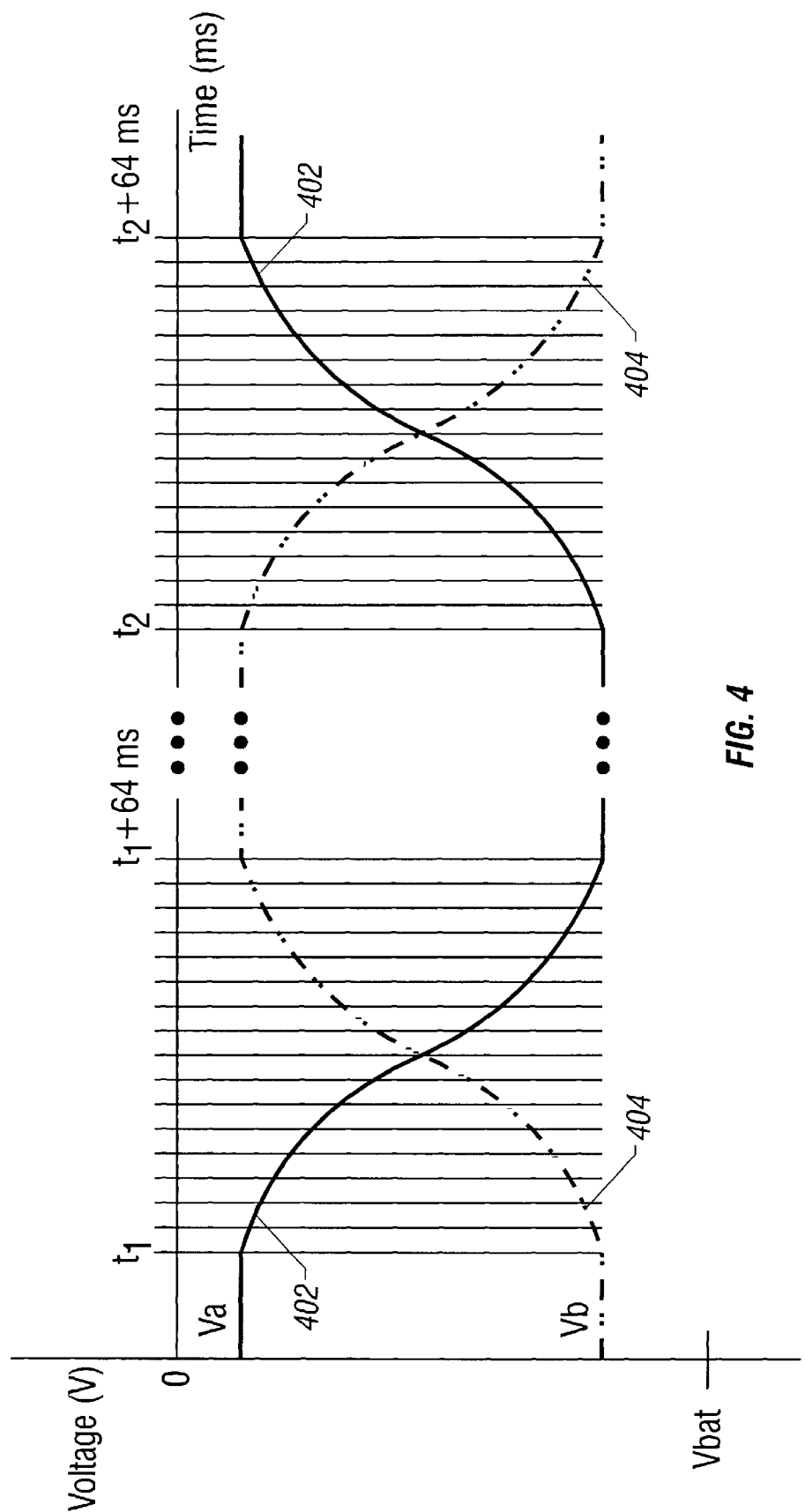
FIG. 4 illustrates an exemplary an exemplary modulated DC waveform.

Referring to FIG. 4, in one embodiment, modulated voltage waveforms 402 and 404, for conductors A and B, respectively, smoothly transition between approximately 0 V and Vbat in response to DC current modulation by each of the digital signal processors 304[m:1]. The waveforms 402 and 404 may be shaped to eliminate most if not all audible frequencies. A margin is maintained between 0 V and Vbat to allow for superimposed AC voltage swings The modulated waveforms 402 and 404 may be shaped in accordance with programmable shaping factors. Thus, the waveforms 402 and 404 can be adapted to meet diverse and dynamic requirements.

Referring to FIG. 3, "m" line cards 308[m:1] may be located in a central office 306, and each of line cards 308[m:1] may support "n" subscriber loops 302[n:1] (also referred to as "channels") where "m" and "n" are integers and "n" may vary from line card to line card. Each of subscriber loops 302[n:1] may be modeled as subscriber loop 102 or modeled in accordance with other transmission line models, and each of the terminal equipment 312[n:1] may be represented by devices such as terminal equipment 110. Each of SLICs 310[m:1] includes "n" subscriber line interface circuits respectively connected to subscriber loops 302[n:1]. SLICs 310[m:1] of line cards 308[m:1] sense data from subscriber loops 302[n:1] such as actual DC line voltage Vab_DC, and AC line signal voltage Vab(AC) across conductors A and B. Line current data, Ia and Ib at conductors A and B, respectively, are generally sensed by SLICs 310[m:1] through external balanced feed resistors (not shown). SLICs 310[m:1] also drive DC feed current, ringing signals, and signaling transmissions, and other data onto subscriber loops 302[n:1], respectively. When DC feed current is flowing into the A conductor from SLICs 310[m:1] and out of the B conductor to respective SLICs 310[m:1], Ia equals the DC feed current minus any longitudinal current, Ilong, and Ib equals the DC feed current plus Ilong. When the DC feed current is reversed during polarity reversals, Ia equals the DC feed current plus Ilong, and Ib equals the DC feed current minus Ilong. Thus, for balanced subscriber loops 302[n:1], Ia minus Ib equals the metallic current, Iab_met, in respective subscriber loops 302[n:1] regardless of the polarity of conductors A and B.

Converters 314[m:1] are two-way communication links between respective digital signal processors 304[m:1] and corresponding analog SLICs 310[m:1]. Each of SLICs 310[m:1] provides analog data signals to a respective digital signal processor 304[m:1], and the digital signal processors 304[m:1] provide digital control and information data signals through D/A converters to the SLICs 310[m:1], respectively. The converters 314[m:1] sample signals, such as the parametric information sensed by SLICs 310[m:1], and perform A/D conversions which allow the analog SLICs 310[m:1] and respective digital signal processors 304[m:1] to communicate with each other. The converters 314[m:1] may also decimate signals from the respective SLICs 310[m:1] and interpolate signals from the digital signal processors 304[m:1]. Additionally, converters 314[m:1] may frame digital signals in accordance with predetermined slot assignments allocated to each of SLICs 310[m:1] and transmit the framed information in a serial data stream to digital signal processors 304[m:1]. Conversely, converters 314[m:1] may parse a serial data stream or streams received from digital signal processors 304[m:1] to transmit respective data to SLICs 310[m:1].

Terminal equipment 312[n:1] may each transmit data signals to any other terminal equipment 312[n:1], connected to the same or different line card, or to terminal equipment (not shown) which is connected to central office 316 or to any other terminal equipment in the PSTN 318, within a private network, or within a wireless network. The data signals from each of terminal equipment 312[n:1] are digitized and routed by the switching network 314 to the intended terminal equipment recipient in accordance with transmitter and receiver identification information.

Figure 5A:
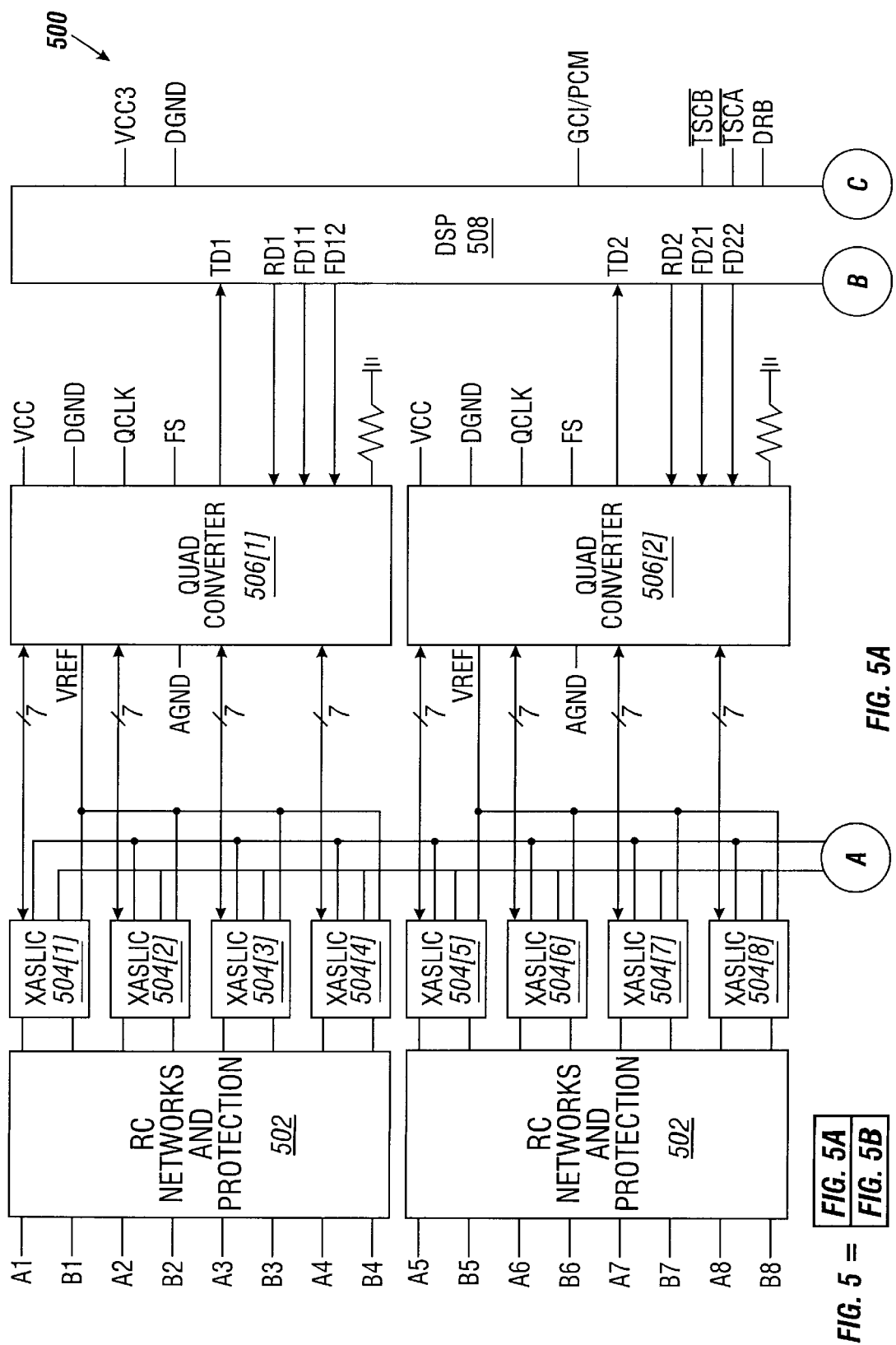
FIG. 5 illustrates an embodiment of the line card of FIG. 3.
Figure 5B:
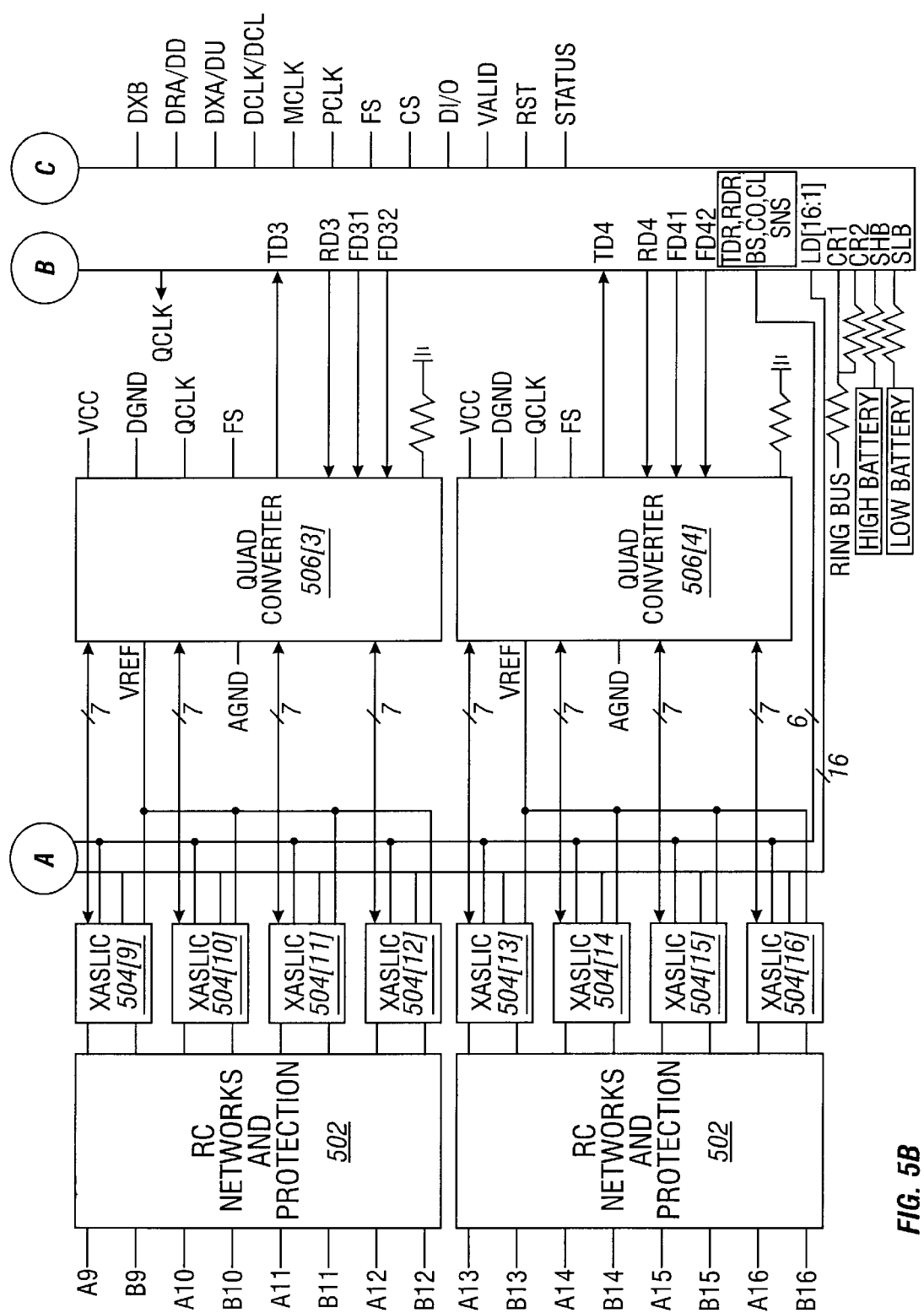

Referring to FIG. 5, one embodiment of each of the respective line cards 308[m:1] is sixteen channel line card 500 which may terminate 16 separate subscriber loops (not shown) such as subscriber loops 302[n:1] where "n" equals 16. Each of the A and B conductors, A[16:1] and B[16:1], are coupled through RC networks and protection circuitry 502. The RC networks and protection circuitry 502 provide an interface between terminal equipment 312[16:1] and subscriber line interface circuits (XASLICs) 504[16:1], respectively. The RC networks and protection circuitry 502 pre-filter input signals received from connected terminal equipment and provide, for example, over current protection for the line card 500. Respective current sense resistors in series between the A and B conductors of each subscriber loop and terminal equipment allow Ia and Ib current samples to be taken by an XASLIC.

The XASLICs 504[16:1] represent an embodiment of SLICs 310[m:1] (FIG. 3), respectively. Subscriber loop 302[x] data, such as AC signal voltage Vab_AC, DC bias voltage Vab_DC, and currents at the subscriber loop A and B conductors, Ia and Ib, respectively, is sensed by each of the XASLICs 504[16:1]. XASLICs 504[16:13], XASLICs [12:9], XASLICs[8:5], and XASLICs[4:1] transmit analog output signals representative of the sensed subscriber loop parametric information to quad converters 506[4:1], respectively. Additionally, XASLICs 504[16:1] receive analog data signals, such as voice signals, a dial tone signal, ringing signals, a DC feed control signal, and a reference voltage, from a connected one of quad converters 506[4:1]. These data signals are superimposed upon a DC bias voltage determined by the DC feed control signal and transmitted over a subscriber loop to terminal equipment. The respective DC feed control signals dictate the polarity of DC bias voltage and the magnitude of DC feed current supplied to the subscriber loops 302[16:1] by each of the XASLICs 504[16:1], respectively. The DC feed control signals ensure that power supplied to respective subscriber loops 302 [16:1] remains within the power envelope dictated by regional specifications and illustratively shown in FIG. 4.

In one embodiment, each of the converters 314[m:1] (FIG. 3) is divided into four quad converters 506[4:1]. Each of the quad converters 506[4:1] provides an A/D and D/A conversion interface between four of the XASLICs 504[16:1] and the digital signal processor 508. AC input signals from XASLICs 504[16:1] such as voice signals are sampled with 6 bit resolution at a frequency of 4 MHz and decimated to reduce the sampling frequency to 32 kHz. Three data signals representing Vab, Ia, and Ib from each of the sixteen supported subscriber loops are all sampled by respective A/D converters with 10 bit resolution at a sampling frequency of 4 kHz. Additionally, Ia is used as an input to thermal shutdown circuitry to detect and respond to potentially dangerous current levels on a subscriber loop. Each of the quad converters 506[4:1] place all of the converted input signals from all sixteen XASLICs 504[16:1] into respective predetermined slots in a 4 MHz digital serial data stream. The 4 MHz serial data streams from each of the quad converters 506[4:1] are received and processed by the digital signal processor 508.

The quad converters 506[4:1] also each receive three 4 MHz serial digital data streams from the digital signal processor 508 which include information for the subscriber loops 302[16:1] supported by the quad converters 506[4:1] and for range control for the respective Vab, Ia, and Ib data input signals to the A/D converters. The range control allows resolution of particular data to be increased or decreased. The digital signal processor 508 output serial data streams include predetermined slots with signal data, such as voice signal data, DC feed control data, and longitudinal voltage compensation data for each of subscriber loops 302[16:1]. These serial data streams are converted into parallel data, parsed for transmission to each of the XASLICs[16:1] from predetermined slots, and routed to respective linear interpolators (not shown). The respective DC feed signal data for each of subscriber loops 302[n:1] is also parsed and routed to respective DC feed linear interpolators (not shown) to increase the sampling frequency from 250 Hz to 256 kHz. The digital output signals from each DC feed linear interpolator are converted into an analog DC feed control signal for respective XASLICs 504[16:1]. XASLICs 504[16:1] provide DC current feed to subscriber loops 302[16:1] respectively, in response to DC current feed levels indicated by the respective DC feed control signal from digital signal processor 508. Four bit resolution longitudinal voltage compensation data signals from digital signal processor 508 for each of subscriber loops 302[16:1], respectively, is also parsed and routed to a D/A converter. The corresponding output analog signals are transmitted to the respective XASLICs 504[16:1] connected to subscriber loops 302 [16:1], respectively.

Figure 6A:
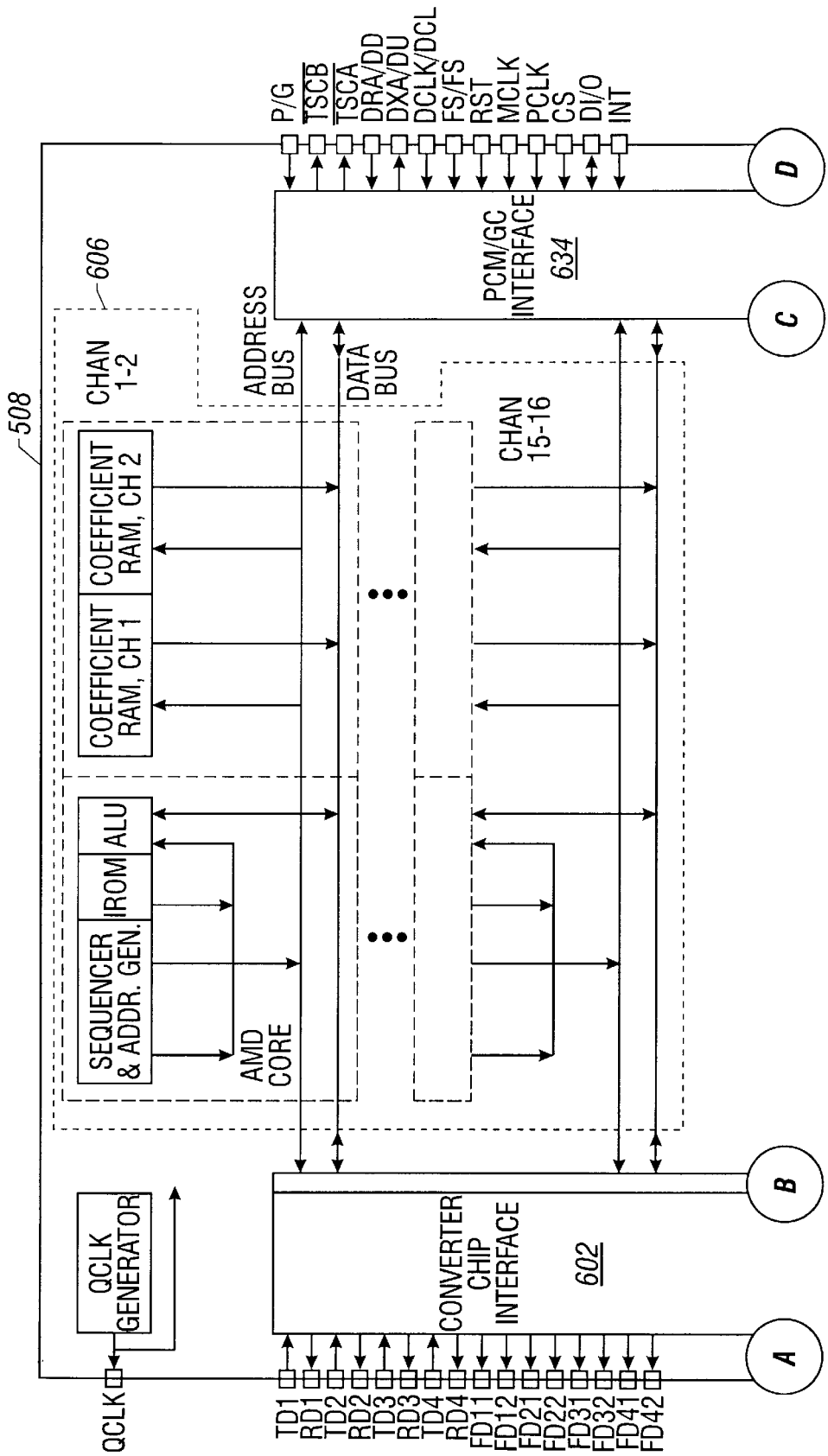
FIG. 6 illustrates an embodiment of the digital signal processor of FIG. 3.
Figure 6B:
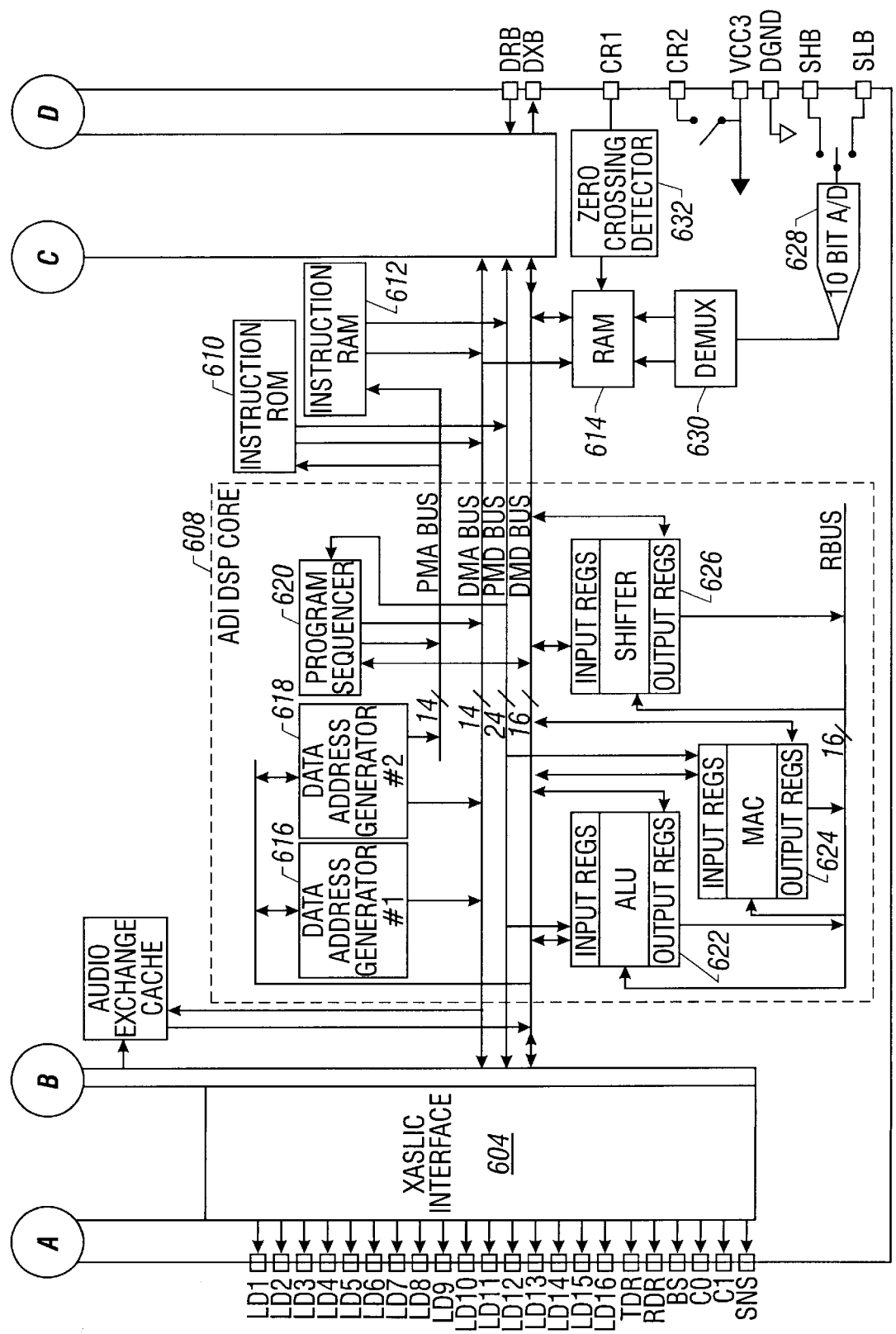

Referring to FIG. 6, the digital signal processor 508 interconnects to the quad converters 506[4:1] through output terminals TD[4:1], RD[4:1], FD11, FD12, FD21, FD22, FD31, FD32, FD41, and FD42 of converter chip interface 602. Converter chip interface 602 processes the serial data streams from each of quad converters 506[4:1] to retrieve information from each predetermined slot in the serial data streams. Thus, information from each of XASLICs 504 [16:1] is available for individual processing by audio processor core 606 and digital signal processor core 608. Converter chip interface 602 also assigns information for respective XASLICs 504[16:1] and quad converters 506 [4:1] from audio processor core 606 and digital signal processor core 608 to respective predetermined time slots in the 4 MHz digital output serial data streams. Each of quad converters 506[4:1] receives three 4 MHz digital data streams from digital signal processor 508, one for audio signals and two for DC feed control and the A/D range control. Digital signal processor 508 also programs a register (not shown) of each of XASLICs 504[16:1] with output signals LD[16:1], respectively, TDR, RDR, BS, C0, C1, and SNS transmitted through the XASLIC interface 604. The register (not shown) controls XASLIC modes such as standby, active, and ringing modes. XASLIC interface 604 inserts register information in predetermined slots for each of respective XASLICs 504[16:1]. Audio processor core 606 provides digital audio signal processing.

The digital signal processor core 608 processes instructions stored in instruction ROM (read only memory) 610 and instruction RAM (random access memory) 612. Data addresses are generated by data address generator #1 616 and data address generator #2 618. The program sequencer 620 provides program execution timing. To perform various arithmetic operations, digital signal processor core 608 also includes an arithmetic logic unit 622, a multiply, accumulate, and carry unit 624, and a shifter 626, each with respective input and output registers.

To utilize accurate, real time central office 306 battery voltage levels in various calculations, central office 306 high and low battery voltages are sampled from input terminals SHB and SLB, respectively. The voltages at input terminals SHB and SLB are sampled by 10 bit A/D converter 628, demultiplexed by demux 630, and stored in RAM 614 as Vbat. Ringing voltage signals from the central office 306 ring generator (not shown) are received at input terminals CR1 and CR2. Zero crossing detector 632 provides data to RAM 614 representing zero crossings of external ringing signals generated by central office 306. Digital signal processor operates on 5 V supplied by the central office 306 at input terminal VCC3. The digital signal processor core 608 and audio processor core 606 transmit to and receive communication signals from the central office 306 (FIG. 3). These communication signals are converted to and from PCM signal format by the PCM/microprocessor interface 634. The PCM/microprocessor interface 634 supports standard direct digital information transfer of, for example, digital filter coefficients, between the line card 508 and central office 306.

Figure 7:
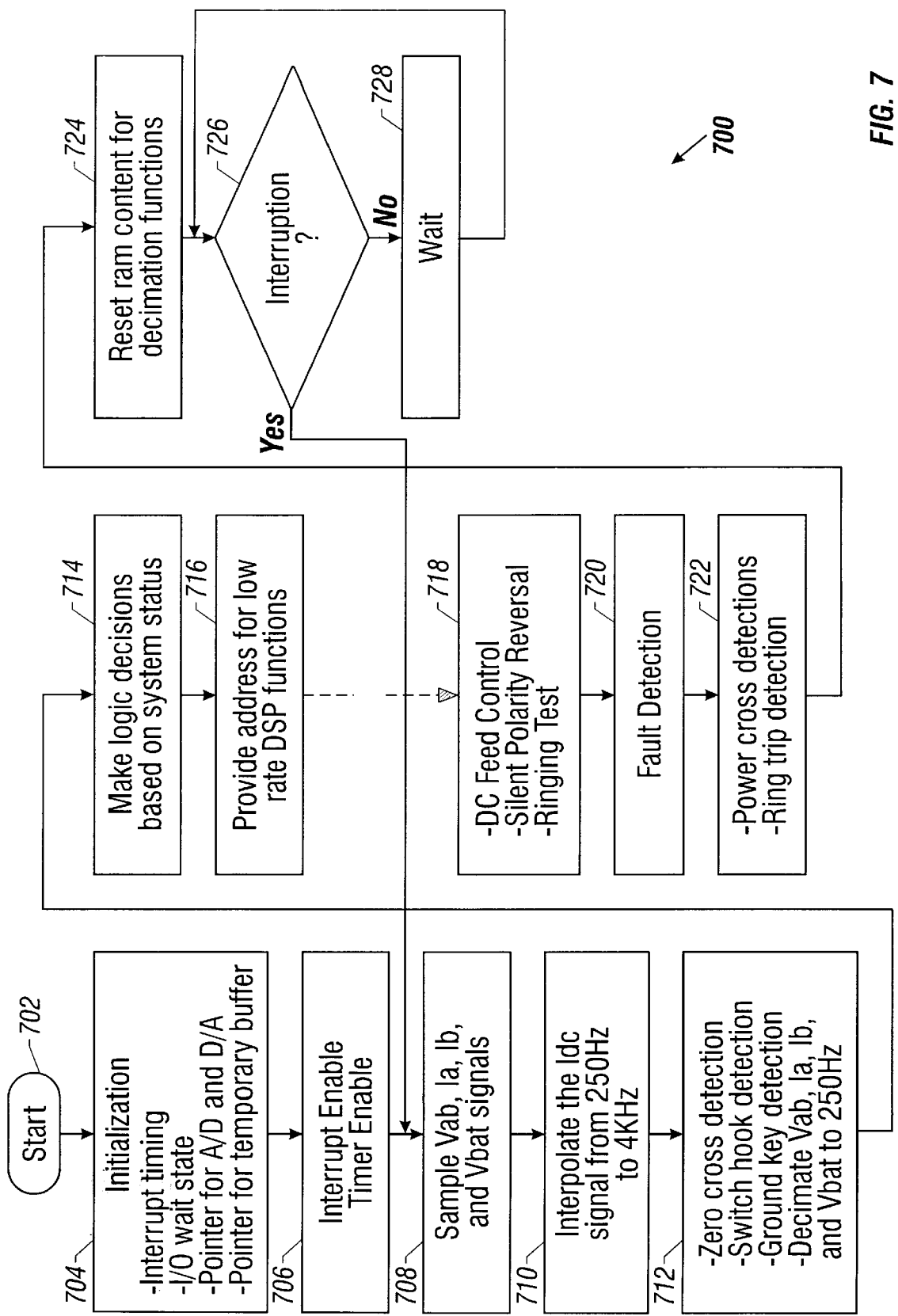
FIG. 7 illustrates an execution timing flow diagram of the digital signal processor of FIG. 6.

Referring to FIG. 7, the digital signal processor 508 executes an endless loop of operation modules. The computer program execution timing of the digital signal processor core 608 proceeds as illustrated in the signal processing flow 700. When the digital signal processor core 608 is started at operation 702, an initialization module 704 sets up interrupt timing so that signal processing flow 700 executes at a predetermined rate. I/O wait states, pointers for the A/D and D/A module 708, and a pointer for a temporary buffer are also set up in operation 702. After initialization, interrupts and a timer are enabled as shown in operation 706. Next, the A/D and D/A module 708 is executed and parametric data, Vab, Ia, and Ib, sampled by each of the XASLICs 504[16:1] (FIG. 5) from each of the respective subscriber loops 302[16:1] and Vbat are retrieved for use by the digital signal processor core 608 in subsequent processing. In operation 710, an interpolator is set up to interpolate 250 Hz data from the digital signal processor 508 to 4 kHz data.

The digital signal processor core 608 then proceeds in subscriber loop status and decimation operation 712 to successively execute zero cross detection, switch hook detection, and ground key detection modules. The zero cross detection module detects the voltage and current zero crossing of an integral ringing signal supplied by the line card 500. Ring relays of the line card 508 disconnect any ringing signals on a subscriber loop 302[x] from a ring generator (not shown) of the central office 306 after a ring trip is detected by power cross and ring trip detection module 722. The ring generator (not shown) is preferably not disconnected after a ring trip detection until a current zero crossing is detected to avoid damaging the ring relays. Ring trip detection is further illustratively described in U.S. patent application, Ser. No. 08/870,893, by Yan Zhou, entitled "Ring Trip Detection In A Communication System", filed concurrently with this patent application and incorporated by reference in its entirety. The switch hook detection module detects loop start signaling on- and off-hook transitions and detects make and break signals (dial pulses). Switch hook detection is further illustratively described in U.S. patent application, Ser. No. 08/870,892, by Yan Zhou, entitled "Switch Hook Status Determination In A Communication System", filed concurrently with this patent application and incorporated by reference in its entirety. The ground key detection module executed by the digital signal processor core 608 in subscriber loop status and decimation operation 712 detects ground start signaling. After executing the zero cross detection, switch hook detection, and ground key detection modules, the 4 kHz sampled data Vab, Ia, and Ib for each subscriber loop, and Vbat data is decimated to a 250 Hz sampling frequency.

Proceeding to system status operation 714, digital signal processor core 608 interprets the zero crossing detection, switch hook detection, and ground key detection status information obtained in subscriber loop status and decimation operation 712 and takes appropriate action such as identifying and forwarding to the central office 306 a number dialed by terminal equipment based upon the number of make and break connections determined by the switch hook detection module, supplying a dial tone to terminal equipment that has seized a subscriber loop, and disconnecting a ringing signal at a zero crossing after a ring trip.

Figure 8:
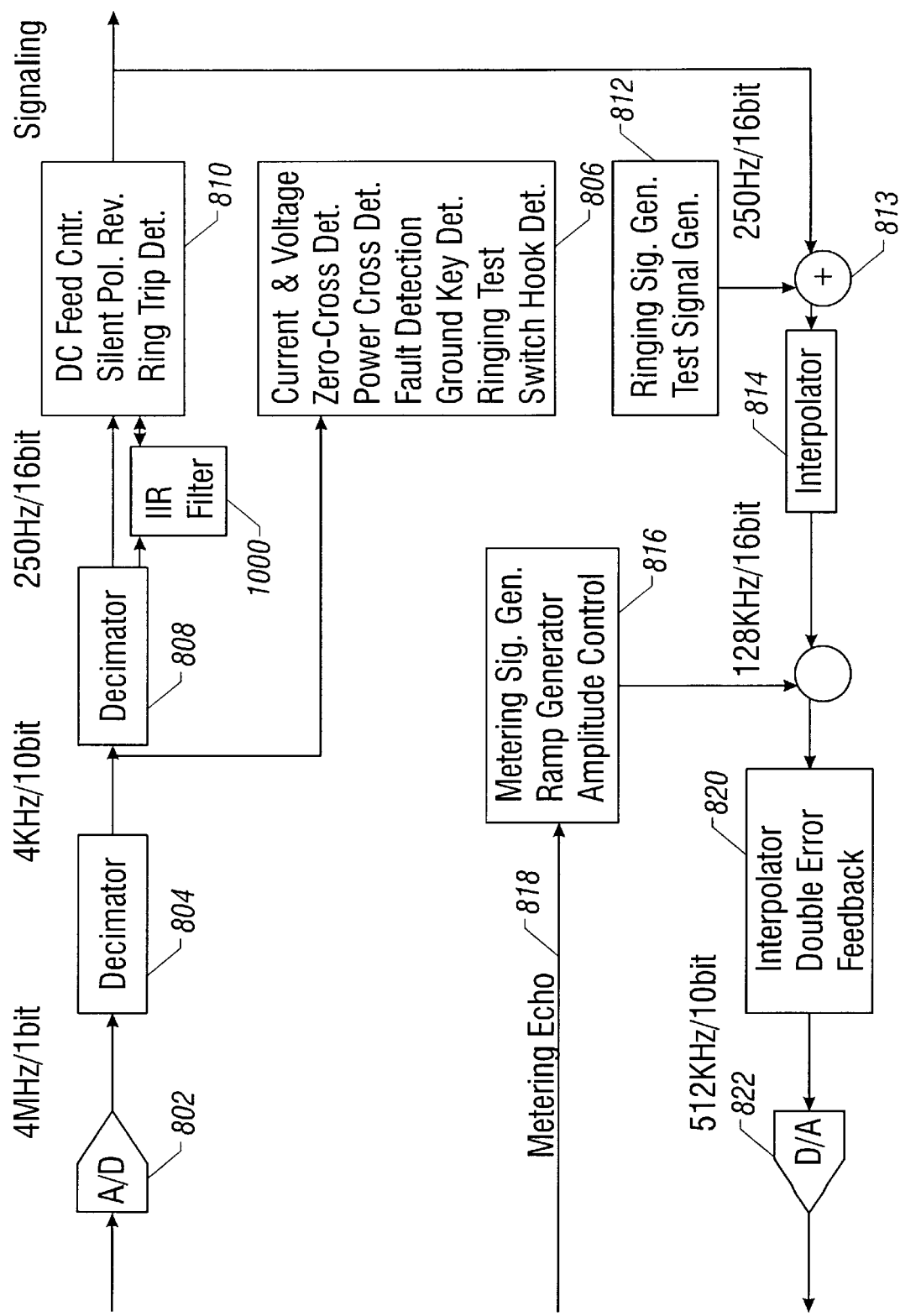
FIG. 8 illustrates input and output data sampling frequencies utilized by the line card of FIG. 5 for each supported subscriber loop.

In one embodiment of the signal processing flow 700, the digital signal processing DC feed control, silent polarity reversal, and ring trip detection functions in the DC feed control module 718 and power cross and ring trip detection module 722 may be performed at a rate relatively lower to other functions while achieving satisfactory performance. Referring to FIG. 8, input and output data sampling frequencies utilized by digital signal processor core 608 for each of supported subscriber loops 302[16:1] are illustrated. As described above, each of the quad converters 506[4:1] performs an A/D conversion 802 on signals received from connected XASLICs 504[16:1] and provides a 4 MHz serial data stream to digital signal processor 508. Decimator 804 of converter chip interface 602 decimates the 4 MHz serial data stream to a sampling frequency of 4 kHz and provides a 10 bit parallel output signal to digital signal processor core 608 which contains the sampled parametric data for each of the supported subscriber loops 302 [16:1] stored in RAM 614. Current and voltage zero cross detection, switch hook detection, and ground key detection modules of operation 712 (FIG. 7), the power cross detection module of operation 722 (FIG. 7), and fault detection module of operation 720 (FIG. 7), corporately shown in operation 806, operate at a 4 kHz rate and utilize the 4 kHz sampled parametric data. The 4 kHz data stream is further decimated to a sampling frequency of 250 Hz by decimator 808 of the converter chip interface 602. The DC feed control and silent polarity reversal modules of operation 718 (FIG. 7) and ring trip detection module of operation 722 (FIG. 7), corporately shown in operation 810, operate at 250 Hz and utilize the 4 kHz and 250 Hz sampled data.

Quad converters 506[x] interpolate DC feed control signals, silent polarity reversal signals, and any ringing and test signals from central office 306 ring and test signal generators 812 from adder 813 to a 128 kHz sampling frequency, 16 bit data stream with interpolator 814. Output signals from metering signal, ramp generator, and amplitude control operation 816 are added by adder 815 to the output data signals of 814. Operational block 816 is illustratively described by Zhou, et al., "Metering Signal Level Control Circuit," U.S. Pat. No. 5,452,345. These composite output signals are for a single subscriber loop 302[x] with each of subscriber loops 302[16:1] being processed serially. For each subscriber loop 302[x], the digital composite output signal from adder 815 is interpolated to a 512 kHz sampling frequency, 10 bit output signal by the single error feedback interpolator 820 in a quad converter 506[x] and converted into an analog signal with the D/A converter 822 of quad converter 506[x] for input to the XASLIC 504[x] connected to the subscriber loop 302[x] just processed.

The digital signal processing DC feed control, silent polarity reversal, and ring trip detection functions in the DC feed control module 718 and power cross and ring trip detection module 722 are low rate functions performed at 250 Hz, one-sixteenth the rate of the subscriber loop status and decimation operation 712 functions. Accordingly, during a single pass through signal processing flow 700, these 250 Hz. low rate functions are only executed for a single subscriber loop 302[x] and are executed for each of subscriber loops 302[16:1] only once every 16 passes. The channel identification module 716 identifies which of subscriber loops 302[16:1] is to be processed during the next execution of operations 718, 720, and 722. After identification, the feed control module 718 provides DC feed control, silent polarity reversal, and a ringing test for the identified subscriber loop 302[x]. DC feed control is illustratively described in U.S. patent application, Ser. No. 08/870,895, by Yan Zhou, entitled "Direct Current Feed With Line Status Change Compensation In A Communication System," filed concurrently with this patent application and incorporated by reference in its entirety.

Figure 9:
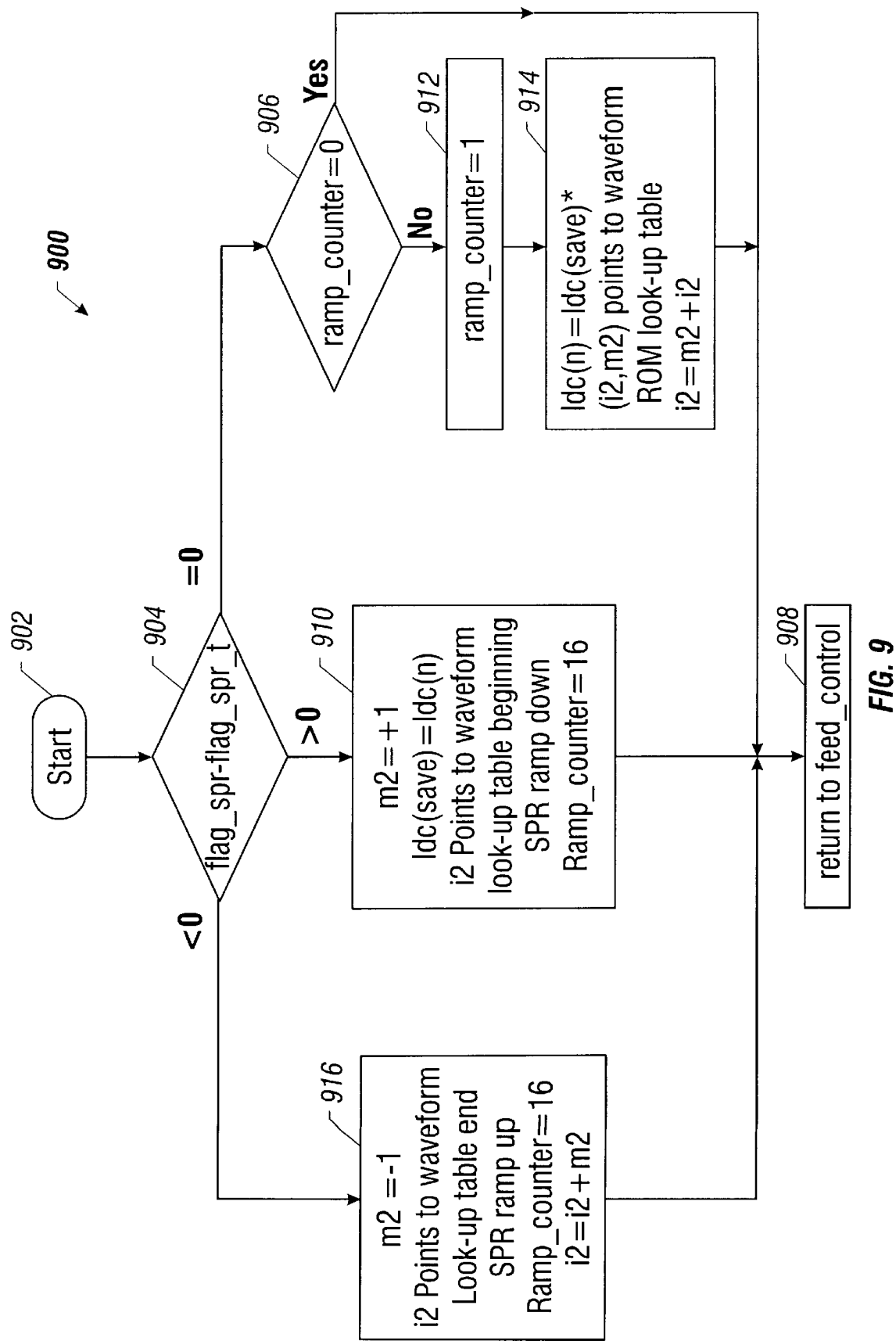
FIG. 9 illustrates an embodiment of the silent polarity reversal module of the digital signal processor execution timing flow diagram of FIG. 7.

Referring to FIG. 9, after the digital signal processor 508 accesses the feed control module 718 in memory, the silent polarity reversal module 900 of feed control module 718 immediately starts in operation 902. The silent polarity reversal module 900 processes every one of subscriber loops 302[16:1] once during each 16 passes. The following description applies to processing of every one of subscriber loops 302[16:1]. Thus, for conciseness, the following describes processing of subscriber loop 302[x] which may represent any one of subscriber loops 302[16:1]. In operation 904, the silent polarity reversal module 900 initially determines whether the central office 306 has requested a polarity reversal. To determine if the central office 306 has requested a polarity reversal and in which direction polarity is to be reversed, operation 904 checks the value of flag_spr against the previous value of flag_spr, flag_spr_t. Initially the digital signal processor 508 flag, 'flag_spr', is set to zero. After each pass through silent polarity reversal module 900, the 'flag_spr' is stored in memory as 'flag_spr_t' for use during the next pass to process subscriber loop 302[x]. In operation 904, silent polarity reversal module 900 determines whether flag_spr has been changed, in response to a polarity reversal request from the central office 306, from the previous pass for subscriber loop 302[x]. The flag_spr equals flag_spr_t if the central office 306 has not requested a new polarity reversal. Assuming that flag_spr equals flag_spr_t, the silent polarity reversal module 900 advances to operation 906 to determine if a polarity reversal is currently on-going for subscriber loop 302[x]. If a variable referred to as 'ramp_counter' equals zero, a polarity reversal is not on-going, and operation 908 causes the digital signal processor core 608 to execute the DC feed module in feed control module 718 as described in the Yan Zhou—"Direct Current Feed With Line Status Change Compensation In A Communication System" patent application. Thus, Vab and metallic loop current remain constant.

When the central office 306 requests a polarity reversal to cause the DC voltage at conductor A (Va) to fall towards Vbat and the voltage at conductor B (Vb) to rise towards ground, flag_spr is set greater than flag_spr_t. Operation 904 determines that flag_spr has changed and is now greater than flag_spr_t. The silent polarity reversal module 900 then advances to operation 910. The actual DC metallic subscriber loop 302[x] current Idc_met is determined by digital signal processor core 608 by calculating the difference between the conductor A current, Ia, and conductor B current, Ib, sampled by XASLIC 504[x]. The actual Idc_met is saved as Idc(save). Operation 910 also initializes the variable 'ramp_counter' to sixteen in preparation for modulating Idc_met during the next pass for subscriber loop 302[x] through silent polarity reversal module 900. The actual Idc-met is modulated using a predetermined waveform with programmable wave shaping factors.

Referring to FIGS. 9 and 10, one embodiment of a waveform modulation look up table 1000 is illustrated with exemplary waveform shaping factors. The variable referred to as 'i2' is used as an index pointer to the waveform shaping factors in the waveform modulation look up table 1000 which is stored in the instruction ROM 610. Each entry in the waveform modulation look up table 1000 provides a wave shaping factor which is divided by 32768 to provide a multiplicand for Idc(save) to create polarity reversal waveform 402 and the conductor B counterpart polarity reversal waveform 404. Initially, i2 is set to 1 and points to the first entry, 32138, in the waveform modulation look up table 1000. Operation 910 also sets a variable, m2, to +1 to increment i2 during each pass through operation 914 for subscriber loop 302[x]. Incrementing i2 allows i2 to progress down waveform modulation look up table 1000. The silent polarity reversal module 900 then returns to feed control module 718 as indicated in operation 908.

The polarity reversal waveforms are mathematically predetermined to preferably modulate Idc_met into a waveform that contains little if any energy in the audio frequency bandwidth. Because the waveform modulation look up table 1000 is programmable, the waveform and, thus, Idc_met may be modulated to any number of desired waveforms by, for example, changing the waveform modulation look up table 1000 entries and/or by changing the integer divisor, 32768. For example, Idc_met may be modulated ;n accordance with a mean squared subscriber loop 302[x] impedance variance error or an absolute maximum subscriber loop 302[x] impedance variance error.

Assuming that Va is approximately 0 V and Vb is approximately equal to Vbat and further assuming that the central office 306 requested a polarity reversal for subscriber loop 302[x] during the previous pass through silent polarity reversal module 900, upon entering silent polarity reversal module 900 again, operation 904 determines that flag_spr minus flag_spr_t equals zero. The variable ramp_counter equals 16, so in operation 912, ramp_counter is decremented by one. In operation 914, Idc(n) is determined by digital signal processor core 608 to equal Idc(save) times 32138/32768 using the i2 equal one entry in the waveform modulation look up table 1000 to determine a multiplicand. Because the silent polarity reversal module 900 is executed at a 250 Hz rate, each entry in the waveform modulation look up table 1000 is used to modify Idc_met for 4 ms.

Referring to FIGS. 8 and 10, Idc(n) determined by silent polarity reversal module 900 is linearly interpolated from a 250 Hz sampling rate to 128 kHz by interpolator 814 and to 512 kHz by interpolator 820. Thus, a continuous 4 ms Idc(n) waveform is generated by digital signal processor core 608 and converted to an analog signal by the one of the quad converters 506[4:1] coupled to subscriber loop 302[x]. The analog signal corresponding to the Idc(n) waveform directs XASLIC 504[x] to match the actual Idc_met with the Idc(n) waveform. Upon entry of silent polarity reversal module 900 again for processing subscriber loop 302[x], silent polarity reversal module 900 will continue to advance to operation 914 until ramp_counter is set to zero by operation 912 during the sixteenth pass. Until ramp_counter equals zero, the m2 variable will continue to walk i2 down the waveform modulation look up table 1000, and Idc(n), and thus Idc_met, will continue to be modulated by multiplying Idc(save) times the waveform modulation look up table 1000 entry pointed to by i2 and dividing by 32768.

Referring to FIG. 4, during each pass through silent polarity reversal module 900, Va and Vb change over a 4 ms interval in accordance with the modulated Idc_met waveform. Thus, after sixteen passes through silent polarity reversal module 900, 64 ms have elapsed and modulated Va and Vb waveforms 402 and 404, respectively, have completely and silently reversed polarity as shown in the time segment between t1 and t1+64 ms.

Assuming that the central office 306 requests digital signal processor core 608 to normalize subscriber loop 302[x] polarity by reversing polarity again, flag_spr is set lower than flag_spr_t. During the next pass through silent polarity reversal module 900 for subscriber loop 302[x], operation 904 determines that flag_spr minus flag_spr_t is less than zero. In operation 916, m2 is set to minus 1, and ramp_counter is again set to sixteen. Additionally, since i2 was incremented to seventeen by operation 914 during the previous polarity operation, i2 is decremented by one to equal sixteen and point to the last entry in waveform modulation look up table 1000. During the next pass through silent polarity reversal module 900 for processing subscriber loop 302[x], flag_spr minus flag_spr_t equals zero and ramp_counter equals sixteen. Thus, in operation 912, ramp_counter is decremented by one, and Idc(n) is determined in operation 914. Because m2 equals minus one, i2 will proceed up waveform modulation look up table 1000 and use the waveform modulation look up table 1000 entries in reverse order from sixteen to one during each pass through silent polarity reversal module 900 for subscriber loop 302[x]. Idc(n) and, thus, Idc_met will be modulated in accordance with Idc(save) times f(t) using successive waveform shaping factors in reverse order to silently reverse polarity of the subscriber loop 302[x].

Referring to FIG. 4, because Idc(save) from operation 910 is still used to modulate Idc with waveform shaping factors divided by 32768, Idc(n) will be modulated to direct XASLIC 504[x] to produce Va and Vb as shown between t2 and t2+64 ms (FIG. 4). During every 4 ms pass through silent polarity reversal module 900 for subscriber loop 302[x], Va and Vb are modulated in accordance with a 512 kHz linear interpolated Idc(n).

Referring to FIG. 7, after exiting the feed control module 718, fault detection module 720 determines whether a fault exists in subscriber loop 302[x].

Signal processing flow 700 then proceeds to power cross and ring trip detection module 722 to detect power zero crossing and a ring trip. The ring trip detection is further illustratively described in Yan Zhou, "Ring Trip Detection In A Communication System." After executing power cross and ring trip detection module 722, RAM contents are reset in operation 724 in anticipation of subsequent decimation functions.

Operation 726 detects an interruption from a system timer (not shown) which occurs at the operating frequency of signal processing flow 700, which in one embodiment is 4 kHz. If the interruption is not received, signal processing flow 700 enters a wait state in operation 728 until the interruption is received. During the wait state, digital signal processing core 608 may perform other functions such as processing audio signals.

While the invention has been described with respect to the embodiments and variations set forth above, these embodiments and variations are illustrative and the invention is not to be considered limited in scope to these embodiments and variations. For example, various sampling rates are indicated which may be changed in accordance with factors such as the processing speed of the digital signal processor core 608. Additionally, different nonlinear interpolation methods may be used to shape the polarity reversal waveforms. Furthermore, additional or fewer waveform shaping factors may be utilized to shape the polarity reversal waveforms. Also, the waveform shaping factors may be stored in programmable memory and altered in accordance with, for example, actual subscriber loop impedance conditions to obtain silent polarity reversal. Additionally, it will be apparent to those of ordinary skill in the art that many of the functions of communication system 300 may be implemented in hardware or software. Also, circuitry may be used to establish a wireless link between each line card 308[m:1] and a central office to provide, for example, remote data and control access. Furthermore, redundant line cards and/or redundant subscriber loop interface circuits may be implemented and switched in when necessary to replace corresponding defective circuitry. Accordingly, various other embodiments and modifications and improvements not described herein may be within the spirit and scope of the present invention, as defined by the following claims.

What is claimed is:

1. A method for modulating a waveform of a transmission line in a communication system comprising the steps of:

responding to a first polarity reversal request wherein said step of responding further comprises:

modulating a first discrete time waveform sampled from the transmission line with a predetermined waveform to generate a second discrete time waveform;

converting the second discrete time waveform into a first continuous time waveform having substantially the same frequency components as the predetermined waveform; and providing the first continuous time waveform to the transmission line.

2. The method as in claim 1, further comprising the steps of:

responding to a second polarity reversal request wherein said step of responding further comprises:

time-inverting the predetermined waveform;

modulating a third discrete time waveform sampled from the transmission line with a predetermined waveform to generate a fourth discrete time waveform;

converting the fourth discrete time waveform into a second continuous time waveform having substantially the same frequency components as the predetermined waveform; and providing the second continuous time waveform to the transmission line.

3. The method as in claim 1 wherein the predetermined waveform is represented by N successive wave shaping factors stored in a memory, and the step of modulating comprises the steps of:

retrieving a first wave shaping factor from the memory;

modulating the first discrete time waveform with the first wave shaping factor to generate a first component of the second discrete time waveform;

retrieving the next successive wave shaping factor stored in the memory;

modulating the first discrete time waveform with the next successive wave shaping factor to generate the next component of the second discrete time waveform; and repeating the steps of retrieving the next successive wave shaping factor and modulating the first discrete time waveform with the next successive wave shaping factor until all N successive wave shaping factors have been so retrieved and the first discrete time waveform is modulated.

4. The method as in claim 3 further comprising the step of:
linearly interpolating each component of the second discrete time waveform.

5. The method as in claim 1 wherein a computer program stored in a machine readable medium includes instructions for implementing the step of modulating, the method further comprising the step of:
executing the instructions with a processor.

6. The method as in claim 5 further comprising the step of:
executing the instructions for each of a plurality of transmission lines.

7. The method as in claim 5 wherein the predetermined waveform is programmable.

8. The method as in claim 1 wherein the step of converting the second discrete time waveform into a continuous time waveform comprises the steps of:
linearly interpolating the second discrete time waveform to generate a third discrete waveform.

9. The method as in 8 wherein the step of linearly interpolating further comprises the step of:
interpolating the second discrete time waveform from a sampling rate of 250 Hz to a sampling rate of 128 kHz.

10. The method as in claim 1 wherein the step of providing the continuous time waveform to the transmission line comprises the step of:
causing analog circuitry to generate a current waveform signal component on the transmission line at least approximately matching the generated continuous waveform.

11. The method as in claim 1 further comprising the step of:
sampling signal data from the transmission line; and
converting the sampled signal data into the first discrete time waveform.

12. The method as in claim 11 wherein the sampled signal data is a metallic direct current flowing in the transmission line.

13. The method as in claim 1 wherein the transmission line is a subscriber loop.

14. The method as in claim 1 wherein the frequency components are generally subaudio.

15. A method for reversing polarity in a communication system comprising the steps of:
receiving a polarity reversal request from a central office;
sampling direct current flowing in a subscriber loop of the communication system;
storing a discrete time version, Idc(n) of the sampled direct current in a memory;
modulating the stored Idc(n) over discrete time intervals with respective portions of a predetermined discrete time waveform;
converting the modulated discrete time waveform into a continuous time control signal; and
providing a continuous time current to the subscriber loop in accordance with the continuous time control signal having substantially the same frequency components as the predetermined discrete time waveform.

16. The method as in claim 15 wherein the subscriber loop includes an A conductor and a B conductor, the method further comprising the steps of:
determining which of conductors A and B the central office requested to be more positive;
if the central office requested Idc(n) to flow from conductor A to conductor B, the step of modulating the stored Idc(n) comprises the step of:
modulating the stored Idc(n) over discrete time intervals with respective portions of the predetermined discrete time waveform, wherein the predetermined discrete time waveform is a time-inverted version of a predetermined waveform used to modulate Idc(n) if the central office requests Idc(n) to flow from conductor B to conductor A.

17. The method as in claim 15 further comprising the steps of:
receiving polarity reversal requests from the central office for up to N additional subscriber loops, wherein N is an integer;
sampling direct current, Idc(n)(N), flowing in each of the additional subscriber loops for which the central office selected for a polarity reversal;
executing a computer program with a processor, wherein the computer program includes executable instructions in a processor-readable medium for implementing the steps of storing and modulating respectively for each sampled direct current of the selected subscriber loops;
converting the respective modulated discrete time waveforms for each of the selected subscriber loops into respective continuous time control signals; and
providing a continuous time current, having substantially the same frequency components as the predetermined discrete waveform, to each of the selected subscriber loops in accordance with the respective continuous time control signals.

18. The method as in claim 15 further comprising the step of:
interpolating the modulated discrete time waveform.

19. The method as in claim 18 wherein the modulated discrete time waveform is linearly interpolated.

20. The method as in claim 15 wherein the memory is a programmable memory.

21. A method of reversing polarity of A and B conductors of a plurality of subscriber loops, the method comprising the steps of:
providing a respective direct current, Idc(N), to each of N subscriber loops, where N is an integer;
detecting each Idc(N);
sampling each Idc(N);
storing each Idc(N) in a memory coupled to a processor;
executing a computer program, for each of the of the N subscriber loops, with the processor, wherein the computer program is stored in a memory coupled to the processor and includes processor executable instructions for:
monitoring for polarity reversal requests for respective subscriber loops from a central office;
if a polarity request is monitored which requests positive polarity with respect to conductor B, the method comprises the steps of:
a) multiplying the stored Idc(N) by a value derived from a first look up table entry of M look up table entries stored in a memory coupled to the processor to generate a discrete time control signal;
b) multiplying the stored Idc(N) by a value derived from a subsequent look up table entry to generate a following discrete time control signal;
c) converting the successive discrete time control signals into a continuous time waveform control signal;
d) generating a current waveform on the respective subscriber loop with approximately the same frequency components as the discrete time waveform control signal; and e) repeating the steps of b), c), and d) for each of the M look up table entries;

if a polarity request is monitored which requests positive polarity with respect to conductor A, the method comprises the steps of:

f) multiplying the stored Idc(N) by a value derived from a last look up table entry of the M look up table entries to generate a discrete time control signal;

g) multiplying the stored Idc(N) by a value derived from a preceding look up table entry to generate a following discrete time control signal;

h) converting the successive discrete time control signals into a continuous time waveform control signal;

i) generating a current waveform on the respective subscriber loop with approximately the same frequency components as the discrete time waveform control signal; and j) repeating the steps of g), h), and i) for each of the M look up table entries.

22. The method as in claim 21 wherein the converting steps c) and h) each comprise the steps of:

linearly interpolating between the discrete time control signals to generate an interpolated discrete time current control signal waveform; and performing a digital to analog conversion of the interpolated discrete time current control signal waveform.

23. The method as in claim 21 wherein N is sixteen.

24. A communication system comprising:

circuitry for sampling a first continuous time signal on a subscriber loop in response to a request for a polarity reversal of the first continuous time signal;

a line card having a processor and a memory and coupled to the sampling circuitry, the memory storing code for execution by the processor, the code including instructions for modulating the sampled first continuous time signal with predetermined discrete time waveform components stored in the memory to generate a discrete time control signal; and circuitry coupled to the processor responsive to the discrete time control signal to drive a second continuous time signal on the subscriber loop, wherein the second continuous time signal has at least approximately the same frequency component(s) as the predetermined discrete waveform.

25. The communication system as in claim 24 further comprising:

a look up table stored in the memory and having entries representing the predetermined discrete time waveform components.

26. The communication system as in claim 24 wherein the memory further includes instructions for determining a direction of the request for a polarity reversal of the first continuous time signal, modulating the sampled first continuous time signal with the predetermined discrete time waveform components to generate the discrete time control signal when a first direction for a polarity reversal is determined, and modulating the sampled first continuous time signal with the predetermined discrete time waveform components to generate a reflection of the discrete time control signal when a second direction for a polarity reversal is determined.

27. The communication system as in claim 24 wherein the subscriber loop includes serially connected terminal equipment.

28. The communication system as in claim 27 wherein the terminal equipment is a member of the group of telephones, facsimile machines, private branch exchanges, voice mail systems key telephone systems, computers, modems, telephone answering machines, alarm systems, and radio control systems.

29. A communication system comprising:

a subscriber line interface circuit having input terminals coupled to respective subscriber loop terminal pairs to detect a direct current signal and having output terminals to receive a continuous time control signal;

analog to digital converter coupled to an output terminal of the subscriber line interface circuit to sample the direct current signal;

a processor coupled to the analog to digital converter for receiving a sample of the direct current signal;

a digital to analog converter coupled between the processor and the subscriber loop;

a memory coupled to the processor and storing code for execution by the processor, the code including instructions for retrieving waveform shaping factors from the memory, for generating a discrete time control waveform, for reversing polarity of the subscriber loop terminal pairs, from a product of the waveform shaping factors and the direct current signal sample, and for providing the discrete time control waveform to the digital to analog converter wherein the code further includes instructions for multiplying the direct current signal sample and a first order of the waveform shaping factors to reverse polarity of the subscriber loop terminal pairs in a first direction and for multiplying the direct current signal sample and a reverse order of the waveform shaping factors to reverse polarity of the subscriber loop terminal pairs in a reverse direction;

wherein the subscriber line interface circuit is responsive to a continuous time control input signal from the digital to analog converter corresponding to the discrete time control waveform.

30. The communication system of claim 29 wherein the waveform shaping factors are linearly derived from respective look up table entries stored in the memory.

31. The communication system of claim 29 wherein the waveform shaping factors are programmable.

32. The communication system of claim 29 wherein the discrete time control waveform contains generally subaudio frequency components.

33. A communication system comprising:

means for receiving a polarity reversal request from a central office;

means for sampling direct current flowing in a subscriber loop of the communication system;

means for storing a discrete time version, Idc(n) of the sampled direct current;

means for modulating the stored Idc(n) over discrete time intervals with respective portions of a predetermined discrete time waveform;

means for converting the modulated discrete time waveform into a continuous time control signal; and means for providing a continuous time current to the subscriber loop in accordance with the continuous time control signal having substantially the same frequency components as the predetermined discrete time waveform.

* * * * *